(12) United States Patent
Hellring et al.

(10) Patent No.: US 9,273,399 B2
(45) Date of Patent: Mar. 1, 2016

(54) PRETREATMENT COMPOSITIONS AND METHODS FOR COATING A BATTERY ELECTRODE

(71) Applicant: PPG Industries Ohio, Inc., Cleveland, OH (US)

(72) Inventors: Stuart D. Hellring, Pittsburgh, PA (US); Randy E. Daughenbaugh, Monroeville, PA (US); Edward F. Rakiewicz, Gibsonia, PA (US); Kevin Thomas Sylvester, Lawrence, PA (US); Nathan J. Silvernail, Allison Park, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 223 days.

(21) Appl. No.: 13/832,074

(22) Filed: Mar. 15, 2013

(65) Prior Publication Data

US 2014/0272583 A1    Sep. 18, 2014

(51) Int. Cl.
*H01M 4/36* (2006.01)
*H01M 4/04* (2006.01)
*C23C 22/34* (2006.01)
*H01M 4/66* (2006.01)
*H01M 4/13* (2010.01)
*H01M 4/505* (2010.01)
*H01M 4/525* (2010.01)
*H01M 4/58* (2010.01)

(52) U.S. Cl.
CPC .............. *C23C 22/34* (2013.01); *H01M 4/0404* (2013.01); *H01M 4/13* (2013.01); *H01M 4/661* (2013.01); *H01M 4/667* (2013.01); *H01M 4/505* (2013.01); *H01M 4/525* (2013.01); *H01M 4/5825* (2013.01); *Y02E 60/122* (2013.01)

(58) Field of Classification Search
CPC ........................... H01M 4/0402; H01M 4/366
USPC ................... 429/213, 231.85, 223, 220, 221; 427/126.1
See application file for complete search history.

(56) References Cited

U.S. PATENT DOCUMENTS 3,095,309 A    6/1963    Zeblisky et al.
3,539,402 A    11/1970   Ries
(Continued)

FOREIGN PATENT DOCUMENTS

CA    2087532 A1    2/1992
DE     828340 C     1/1952
(Continued)

OTHER PUBLICATIONS

Fluoropolymers for Li-ion Batteries, Solvay Specialty Polymers, 2012.
(Continued)

*Primary Examiner* — Stewart Fraser
(74) *Attorney, Agent, or Firm* — Alicia M. Passerin, Esq.; Charles M. Yeomans, Esq.

(57) ABSTRACT

Disclosed is a cathode of a lithium-ion battery having a conductive substrate, a first layer covering at least a portion of the conductive substrate comprising a pretreatment composition comprising a Group IIIB and/or Group IVB metal, and a second layer covering at least a portion of the conductive substrate and first layer, the second layer comprising a coating composition comprising a lithium-containing compound. Also disclosed is method for treating a battery cathode and a battery having the treated cathode.

20 Claims, 1 Drawing Sheet

(56) References Cited

U.S. PATENT DOCUMENTS

| | | | |
|---|---|---|---|
| 3,682,713 | A | 8/1972 | Ries et al. |
| 3,752,707 | A | 8/1973 | Newell et al. |
| 3,912,548 | A | 10/1975 | Faigen |
| 3,928,157 | A | 12/1975 | Suematsu et al. |
| 3,964,936 | A | 6/1976 | Das |
| 4,009,115 | A | 2/1977 | Binns |
| 4,017,334 | A | 4/1977 | Matsushima et al. |
| 4,148,670 | A | 4/1979 | Kelly |
| 4,273,592 | A | 6/1981 | Kelly |
| 4,313,769 | A | 2/1982 | Frelin et al. |
| 4,338,140 | A | 7/1982 | Reghi |
| 4,370,177 | A | 1/1983 | Frelin et al. |
| 4,437,947 | A | 3/1984 | Saito et al. |
| 4,470,853 | A | 9/1984 | Das et al. |
| 4,668,421 | A | 5/1987 | Dollman |
| 4,728,456 | A | 3/1988 | Yamasoe et al. |
| 4,992,115 | A | 2/1991 | Ikeda |
| 4,992,116 | A | 2/1991 | Hallman |
| 5,073,196 | A | 12/1991 | Fotinos et al. |
| 5,104,577 | A | 4/1992 | Ikeda et al. |
| 5,143,562 | A | 9/1992 | Boulos |
| 5,149,382 | A | 9/1992 | Gray |
| 5,209,788 | A | 5/1993 | McMillen et al. |
| 5,296,052 | A | 3/1994 | Ikeda et al. |
| 5,328,525 | A | 7/1994 | Musingo et al. |
| 5,342,456 | A | 8/1994 | Dolan |
| 5,380,374 | A | 1/1995 | Tomlinson |
| 5,441,580 | A | 8/1995 | Tomlinson |
| 5,449,415 | A | 9/1995 | Dolan |
| 5,460,694 | A | 10/1995 | Schapira et al. |
| 5,464,706 | A * | 11/1995 | Dasgupta et al. ......... 429/218.1 |
| 5,518,839 | A | 5/1996 | Olsen |
| 5,653,823 | A | 8/1997 | McMillen et al. |
| 5,662,746 | A | 9/1997 | Affinito |
| 5,728,233 | A | 3/1998 | Ikeda et al. |
| 5,759,244 | A | 6/1998 | Tomlinson |
| 5,769,967 | A | 6/1998 | Dolan |
| 5,868,819 | A | 2/1999 | Guhde et al. |
| 5,868,872 | A | 2/1999 | Karmaschek et al. |
| 5,897,716 | A | 4/1999 | Reghi et al. |
| 5,952,049 | A | 9/1999 | Tomlinson |
| 6,083,309 | A | 7/2000 | Tomlinson |
| 6,090,224 | A | 7/2000 | Wichelhaus et al. |
| 6,168,868 | B1 | 1/2001 | Hauser et al. |
| 6,193,815 | B1 | 2/2001 | Wada et al. |
| 6,419,731 | B2 | 7/2002 | Inbe et al. |
| 6,562,148 | B1 | 5/2003 | Wendel et al. |
| 6,749,694 | B2 | 6/2004 | Greene et al. |
| 6,761,933 | B2 | 7/2004 | Warburton et al. |
| 6,805,756 | B2 | 10/2004 | Claffey et al. |
| 6,869,513 | B2 | 3/2005 | Kulfan et al. |
| 7,316,864 | B2 | 1/2008 | Nakayama et al. |
| 7,438,972 | B2 | 10/2008 | Faler et al. |
| 7,510,612 | B2 | 3/2009 | Matsukawa et al. |
| 7,531,051 | B2 | 5/2009 | Nakayama et al. |
| 8,075,708 | B2 | 12/2011 | Matsukawa et al. |
| 8,097,093 | B2 | 1/2012 | Brent et al. |
| 8,652,270 | B2 | 2/2014 | Brent et al. |
| 8,673,091 | B2 | 3/2014 | McMillen et al. |
| 2003/0205299 | A1 | 11/2003 | Greene et al. |
| 2003/0209293 | A1 | 11/2003 | Sako et al. |
| 2003/0221751 | A1 | 12/2003 | Claffey et al. |
| 2004/0020564 | A1 | 2/2004 | Schenzle et al. |
| 2004/0079647 | A1 | 4/2004 | Warburton et al. |
| 2004/0129346 | A1 | 7/2004 | Kolberg et al. |
| 2004/0144451 | A1 | 7/2004 | Matsukawa et al. |
| 2004/0163735 | A1 | 8/2004 | Matsukawa et al. |
| 2004/0163736 | A1 | 8/2004 | Matsukawa et al. |
| 2004/0170840 | A1 | 9/2004 | Matsukawa et al. |
| 2004/0187967 | A1 | 9/2004 | Matsukawa et al. |
| 2004/0244874 | A1 | 12/2004 | Nakayama et al. |
| 2004/0244875 | A1 | 12/2004 | Yasuda et al. |
| 2005/0067057 | A1 | 3/2005 | Ishikura et al. |
| 2005/0118440 | A1 | 6/2005 | Mahon et al. |
| 2005/0287348 | A1 | 12/2005 | Faler et al. |
| 2006/0185769 | A1 | 8/2006 | Nakayama et al. |
| 2007/0068602 | A1 | 3/2007 | Pemberton et al. |
| 2007/0272900 | A1 | 11/2007 | Yoshida et al. |
| 2008/0020133 | A1 | 1/2008 | Kobori et al. |
| 2008/0280046 | A1 | 11/2008 | Bryden et al. |
| 2008/0286470 | A1 | 11/2008 | Matsukawa et al. |
| 2008/0302448 | A1 | 12/2008 | Frey et al. |
| 2009/0032144 | A1 | 2/2009 | McMillen et al. |
| 2009/0084682 | A1 | 4/2009 | McMillen et al. |
| 2010/0038250 | A1 | 2/2010 | Matsukawa et al. |
| 2010/0243108 | A1 | 9/2010 | Karabin et al. |
| 2011/0041957 | A1 | 2/2011 | Brouwer et al. |
| 2011/0053041 | A1 * | 3/2011 | Tucker et al. ................. 429/486 |
| 2012/0183806 | A1 | 7/2012 | McMillen et al. |
| 2012/0308863 | A1 * | 12/2012 | Masumoto et al. ............. 429/94 |
| 2013/0034742 | A1 | 2/2013 | Silvernail et al. |
| 2013/0213896 | A1 | 8/2013 | Vargas et al. |
| 2013/0280599 | A1 * | 10/2013 | Matsumoto et al. .......... 429/200 |

FOREIGN PATENT DOCUMENTS

| | | | |
|---|---|---|---|
| DE | 2707405 | A1 | 1/1978 |
| DE | 19705701 | A1 | 8/1998 |
| DE | 19723350 | A1 | 12/1998 |
| DE | 10114232 | A1 | 10/2002 |
| EP | 0012463 | A1 | 6/1980 |
| EP | 0337075 | A2 | 10/1989 |
| EP | 0411609 | A2 | 2/1991 |
| EP | 0817872 | A1 | 1/1998 |
| EP | 1571237 | A1 | 9/2005 |
| EP | 1997935 | A1 | 12/2008 |
| EP | 2302098 | A1 | 3/2011 |
| GB | 2014617 | A | 8/1979 |
| GB | 2259920 | A | 3/1993 |
| JP | 2006219691 | A | 8/2006 |
| WO | 8505131 | A1 | 11/1985 |
| WO | 9504169 | A1 | 2/1995 |
| WO | 9510641 | A1 | 4/1995 |
| WO | 9533869 | A1 | 12/1995 |
| WO | 9607772 | A1 | 3/1996 |
| WO | 9619595 | A1 | 6/1996 |
| WO | 9621752 | A1 | 7/1996 |
| WO | 9946422 | A1 | 9/1999 |
| WO | 0148264 | A1 | 7/2001 |
| WO | 2005001158 | A1 | 1/2005 |
| WO | 2006062037 | A1 | 6/2006 |
| WO | 2007100017 | A1 | 9/2007 |
| WO | 2008075739 | A1 | 6/2008 |
| WO | 2009020794 | A2 | 2/2009 |
| WO | WO 2009/130550 | A1 | 10/2009 |
| WO | 2011053518 | A1 | 5/2011 |
| WO | 2011090691 | A2 | 7/2011 |
| WO | WO 2012093616 | * | 7/2012 |
| WO | WO 2012/175301 | A2 | 12/2012 |

OTHER PUBLICATIONS

KOLPHOS ZP A revolution in Pre-treatment, Issue 2, Jun. 2004.

Safety Data Sheet, Houghto-Phos ZP, Houghton plc, issued Feb. 25, 2005.

Standard test method for peel or stripping strength of adhesive bonds, ASTM D903-98.

* cited by examiner

PRETREATMENT COMPOSITIONS AND METHODS FOR COATING A BATTERY ELECTRODE

FIELD OF THE INVENTION

The present invention relates to pretreatment compositions and methods for coating a battery electrode. The present invention also relates to coated battery electrodes.

BACKGROUND INFORMATION

Electrodes for use in lithium-ion batteries are made by bonding an active material to a conductive substrate through the use of a binder. The performance and lifetime of a lithium-ion battery depends, at least in part, on the anti-corrosive properties of the electrode and on adhesive strength between the active material and the conductive substrate. Electrode corrosion may lead to reduced adhesive strength, and reduced adhesive strength can result in electrode corrosion. Thus, optimizing both the anti-corrosive properties of the electrode and the adhesive strength between the active material and the conductive substrate is important.

While increased amounts of binder may increase adhesive strength, high amounts of binder reduce the capacity of the electrode and therefore negatively impacts battery performance. As a result, it would be desirable to provide compositions and methods for treating a conductive substrate to improve adhesive strength of the lithium-containing material to the conductive substrate and/or corrosive properties while not requiring increased amounts of binder material. Moreover, it would be desirable to provide compositions and methods for treating a conductive substrate that, in at least some cases, imparts adhesive strength that are equivalent to, or even superior to, the adhesive properties imparted through the use of increased amounts of binder material. It would also be desirable to provide related treated electrodes.

SUMMARY OF THE INVENTION

In certain embodiments, the invention is directed to a cathode of a lithium-ion battery comprising a conductive substrate, a first layer covering at least a portion of the conductive substrate comprising a pretreatment composition comprising a Group IIIB and/or Group IVB metal, and a second layer covering at least a portion of the first layer, the second layer comprising a coating composition comprising a lithium-containing compound.

In certain other embodiments, the invention is directed to a battery comprising a cathode comprising a conductive substrate, a first layer covering at least a portion of the conductive substrate comprising a pretreatment composition comprising a Group IIIB and/or Group IVB metal, and a second layer covering at least a portion of the first layer, the second layer comprising a coating composition comprising a lithium-containing compound. The battery also comprises an anode, a separator between the anode and the cathode, and an electrolyte in contact with the anode and the cathode.

In certain other embodiments, the invention is directed to a method for treating a battery cathode, comprising contacting a conductive substrate of the battery cathode with a pretreatment composition comprising a Group IIIB and/or Group IVB metal, and depositing a coating composition comprising lithium-containing compounds over at least a portion of the pretreated conductive substrate.

The accompanying drawings, which are incorporated in and constitute a part of this specification, illustrate some non-limiting embodiments of the invention and together with the description, serve to explain the invention.

DETAILED DESCRIPTION OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

Unless otherwise disclosed herein, as used herein, the term "substantially free" means that a particular material is not purposefully added to a composition and only is present in trace amounts or as an impurity. As used herein, the term "completely free" means that a composition does not comprise a particular material. That is, the composition comprises 0 weight percent of such material.

Figure 1:
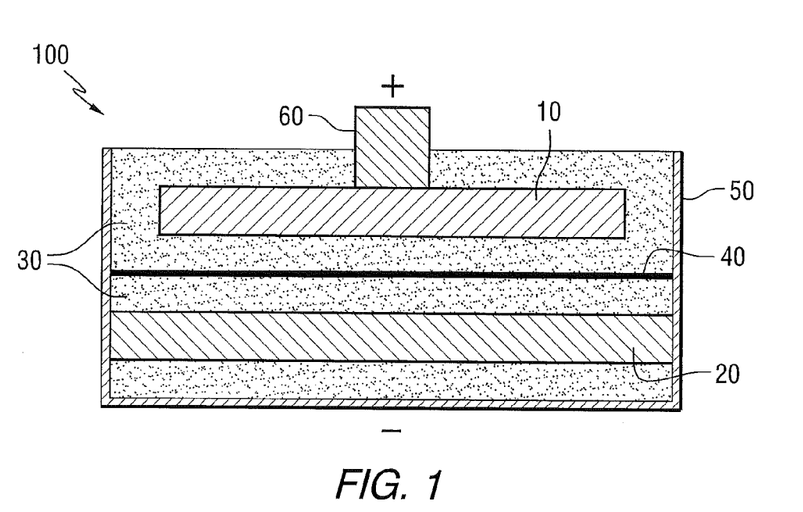
FIG. 1 is a partially schematic side sectional view of a battery including a cathode comprising a first layer comprising a pretreatment composition in accordance with an embodiment of the present invention.
Figure 2:
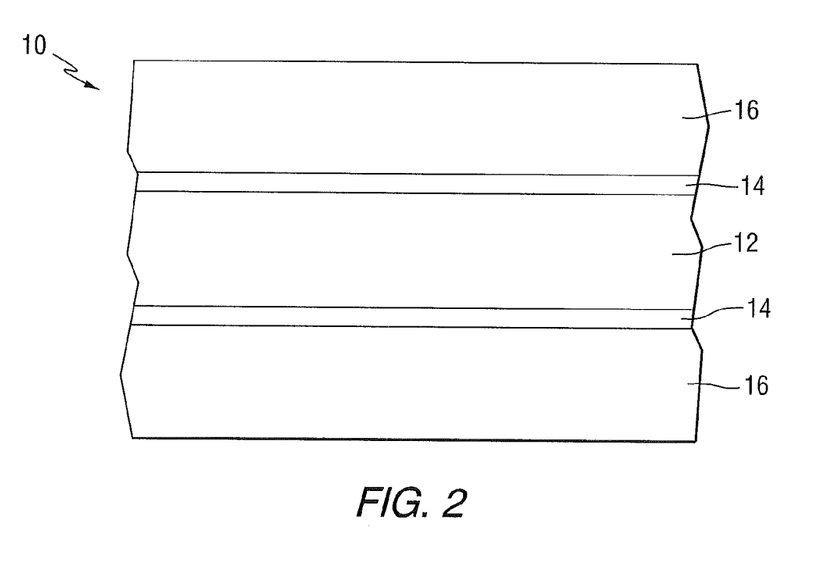
FIG. 2 is a partially schematic side sectional view of a cathode in accordance with an embodiment of the present invention.

FIG. 1 schematically illustrates a battery 100 in accordance with an embodiment of the present invention. While a single cathode layer 10 and a single anode layer 20 is illustrated, it is to be understood that batteries 100 may have multiple cathode 10 and anode 20 layers, each of which is separated by a separator 40. FIG. 2 schematically illustrates a cathode 10 in accordance with an embodiment of the present invention which may be used in a battery in which multiple alternating anode and cathode layers are used.

As illustrated in FIGS. 1 and 2, certain embodiments of the invention are directed to a cathode 10 of a lithium-ion battery 100 comprising a conductive substrate 12 (sometimes referred to as a "collector" or an "electron collector"), a first layer 14 covering at least a portion of the conductive substrate comprising a pretreatment composition comprising a Group IIIB and/or Group IVB metal, and a second layer 16 covering at least a portion of the first layer, the second layer 16 comprising a coating composition comprising a lithium-containing compound. The treatment of the conductive substrate 12 with the pretreatment composition may result in improved anti-corrosive properties of the electrode and improved adhesion of the coating composition comprising the lithium-containing compound to the conductive substrate compared to conductive substrates that have not been pretreated with the pretreatment composition.

Certain embodiments of the present invention are directed to compositions and methods for treating a conductive substrate 12.

As illustrated in FIG. 1, the battery 100 may include a cathode 10, an anode 20, a separator 40 between the anode 20 and cathode 10, and an electrolyte 30 in contact with the cathode 10 and anode 20. A casing 50 that is in contact with one of the electrodes 10, 20 may encase the electrodes 10, 20, the electrolyte 30, and the separator 40. A terminal 60 is in contact with the cathode 10. Suitable conductive substrates 12 for use in the present invention include that those that are often used as electrodes, such as a cathode 10 or an anode 20, in a lithium-ion battery 100. Specific examples of suitable conductive substrates 12 include, but are not limited to, aluminum, copper, iron, nickel, stainless steel, and combinations thereof. In certain embodiments, the conductive substrate 12 of the cathode 10 may comprise aluminum. In certain embodiments, the conductive substrate of the anode 20 may comprise copper. In certain embodiments, the conductive substrate may be in a sheet form having a thickness of 1 µm to 500 µm, such as 15 µm.

The electrolyte 30 may comprise a non-aqueous solution prepared by dissolving a salt in an organic solvent. The electrolyte salt used in the electrolyte may be any electrolyte salt suitable for batteries of this type. Examples of the electrolyte salts include LiClO4, LiAsF6, LiPF6, LiBF4, LiB(C6H5)4, LiB(C2O4)2, CH3SO3Li, CF3SO3Li, LiCl, LiBr and the like. In embodiments, the organic solvent can include any suitable type that has been generally used for batteries of this type. Examples of such organic solvents include propylene carbonate, ethylene carbonate, diethyl carbonate, dimethyl carbonate, 1,2-dimethoxyethane, 1,2-diethoxyethane, γ-butyrolactone, tetrahydrofuran, 2-methyl tetrahydrofuran, 1,3-dioxolane, 4-methyl-1,3-dioxolane, diethyl ether, sulfolane, methylsulfolane, acetonitrile, propionitrile, anisole, acetate, butyrate, propionate and the like. In certain embodiments, cyclic carbonates such as propylene carbonate, or chain carbonates such as dimethyl carbonate and diethyl carbonate, are used. These organic solvents can be used singly or in a combination of two types or more. In certain embodiments, the electrolyte may also comprise additives or stabilizers such as VC (vinyl carbonate), VEC (vinyl ethylene carbonate), EA (ethylene acetate), TPP (triphenylphosphate), phosphazenes, LiBOB, LiBETI, LiTFSI, BP (biphenyl), PS (propylene sulfite), ES (ethylene sulfite), AMC (allylmethylcarbonate), and APV (divinyladipate).

In certain embodiments, the anode 20 may be prepared by mixing a negative active material, a conductive material, and a binder by any method known to those skilled in the art, as described, for example, in Lithium-Ion Batteries: Science and Technologies, Yoshio et al., 2009. In certain embodiments, the anode may be prepared by mixing about 93 wt % of graphite as a negative active material, about 3 wt % of conductive carbon (e.g. acetylene black), and about 4 wt % of a binder, such as for example polyvinylidene difluoride (PVDF), and using a copper current collector foil, typically of 10-15 µm thickness.

In certain embodiments, the cathode 10 may be prepared by mixing a positive active material, a conductive material, and a binder by any method known to those skilled in the art, as described, for example, in Lithium-Ion Batteries: Science and Technologies, Yoshio et al., 2009. In certain embodiments, the cathode may be prepared by mixing about 90 wt % LiNiCoMnO2 as the lithium active material, about 5 wt % of conductive carbon (e.g., acetylene black), and about 5 wt % of a binder, such as PVDF, and using an aluminum collector foil, typically of 10-15 µm thickness.

In certain embodiments, and as illustrated in FIG. 1, the anode 20 and the cathode 10 (described below) may be separated by a separator 40. In certain embodiments, the separator may be formed of a polymer film, such as polyethylene or polypropylene, having micro pores may be laminated. In certain embodiments, the anode 20, the cathode 10, and the separator 40 may be spirally wound to produce a spiral type electrode element. In certain embodiment, the roll may have an oblong shape.

In accordance with embodiments of the invention, and as schematically illustrated in FIG. 2, the cathode 10 comprises a conductive substrate 12, a first layer 14 covering at least a portion of the conductive substrate 12 comprising a pretreatment composition comprising a Group IIIB and/or Group IVB metal, and a second layer 16 covering at least a portion of the first layer 14, the second layer 16 comprising a coating composition comprising a lithium-containing compound.

The conductive substrate 12 to be treated in accordance with the methods of the present invention may first be cleaned to remove grease, dirt, or other extraneous matter. This is often done by employing mild or strong alkaline cleaners, such as are commercially available and conventionally used in metal pretreatment processes. Examples of alkaline cleaners suitable for use in the present invention include Chemkleen 163, Chemkleen 177, Chemkleen 490MX, Chemkleen 2010LP/Chemkleen 181ALP, each of which are commercially available from PPG Industries, Inc. Such cleaners are often followed and/or preceded by a water rinse.

In certain embodiments, the conductive substrate 12 to be treated in accordance with the methods of the present invention may first be rinsed with a solution of fluoride to etch the surface thereof. As used herein, the term "etch" refers to a composition that, upon contact with a substrate, activates the surface for better reaction with subsequent coating steps, including for example a pretreatment step. In certain embodiments, the step of rinsing the substrate with a fluoride solution may remove oxide layers and/or increase the surface area of the substrate, and, in the case of aluminum foils, may remove the less reactive aluminum oxide surface layers to expose a more reactive aluminum surface to thereby enhance deposition of the pretreatment coating.

As previously indicated, certain embodiments of the present invention are directed to methods treating a conductive substrate 12 that comprise contacting the conductive substrate with a pretreatment composition comprising a group IIIB and/or IVB metal. In embodiments, the group IIIB and/or Group IVB metal is deposited onto the conductive substrate. Often, the pretreatment composition comprises a carrier, often an aqueous medium, so that the composition is in the form of a solution or dispersion of a group IIIB or IVB metal compound in the carrier. In these embodiments, the solution or dispersion may be brought into contact with the substrate by any of a variety of known techniques, such as dipping or immersion, spraying, intermittent spraying, dipping followed by spraying, spraying followed by dipping, brushing, or roll-coating. In certain embodiments, the solution or dispersion when applied to the conductive substrate is at a temperature ranging from 60 to 150° F. (15 to 65° C.). The contact time is often from 10 seconds to five minutes, such as 30 seconds to 2 minutes.

As used herein, the term "pretreatment composition" refers to a composition that upon contact with the conductive substrate, reacts with and chemically alters the substrate surface and binds to it to form a protective layer.

As used herein, the term "group IIIB and/or IVB metal" refers to an element that is in group IIIB or group IVB of the CAS Periodic Table of the Elements as is shown, for example, in the Handbook of Chemistry and Physics, $63^{rd}$ edition (1983). Where applicable, the metal themselves may be used. In certain embodiments, a group IIIB and/or IVB metal compound is used. As used herein, the term "group IIIB and/or IVB metal compound" refers to compounds that include at least one element that is in group IIIB or group IVB of the CAS Periodic Table of the Elements.

In certain embodiments, the group IIIB and/or IVB metal compound used in the pretreatment composition may be a compound of zirconium, titanium, hafnium, yttrium, cerium, praseodymium, or a mixture thereof. Suitable compounds of zirconium include, but are not limited to, hexafluorozirconic acid, alkali metal and ammonium salts thereof, ammonium zirconium carbonate, zirconyl nitrate, zirconium carboxylates and zirconium hydroxy carboxylates, such as hydrofluorozirconic acid, zirconium acetate, zirconium oxalate, ammonium zirconium glycolate, ammonium zirconium lactate, ammonium zirconium citrate, and mixtures thereof. Suitable compounds of titanium include, but are not limited to, fluorotitanic acid and its salts. A suitable compound of hafnium includes, but is not limited to, hafnium nitrate. A suitable compound of yttrium includes, but is not limited to, yttrium nitrate. A suitable compound of cerium includes, but is not limited to, cerous nitrate. A suitable compound of praseodymium includes, but is not limited to, praseodymium nitrate.

In certain embodiments, the group IIIB and/or IVB metal compound is present in the pretreatment composition in an amount of at least 20 ppm, such as at least 50 ppm metal, or, in some cases, at least 180 ppm metal (measured as elemental metal). In certain embodiments, the group IIIB and/or IVB metal compound is present in the pretreatment composition in an amount of no more than 5000 ppm metal, such as no more than 1000 ppm metal, or, in some cases, no more than 300 ppm metal (measured as elemental metal). The amount of group IIIB and/or IVB metal in the pretreatment composition can range between any combination of the recited values inclusive of the recited values.

In certain embodiments, the pretreatment composition also comprises an electropositive metal. As used herein, the term "electropositive metal" refers to metals that are more electropositive than the metal substrate. This means that, for purposes of the present invention, the term "electropositive metal" encompasses metals that are less easily oxidized than the metal of the metal substrate that is being treated. As will be appreciated by those skilled in the art, the tendency of a metal to be oxidized is called the oxidation potential, is expressed in volts, and is measured relative to a standard hydrogen electrode, which is arbitrarily assigned an oxidation potential of zero. The oxidation potential for several elements is set forth in the table below. An element is less easily oxidized than another element if it has a voltage value, E*, in the following table, that is greater than the element to which it is being compared.

| Element | Half-cell reaction | Voltage, E* |
| --- | --- | --- |
| Potassium | $K^+ + e \to K$ | −2.93 |
| Calcium | $Ca^{2+} + 2e \to Ca$ | −2.87 |
| Sodium | $Na^+ + e \to Na$ | −2.71 |
| Magnesium | $Mg^{2+} + 2e \to Mg$ | −2.37 |
| Aluminum | $Al^{3+} + 3e \to Al$ | −1.66 |
| Zinc | $Zn^{2+} + 2e \to Zn$ | −0.76 |
| Iron | $Fe^{2+} + 2e \to Fe$ | −0.44 |
| Nickel | $Ni^{2+} + 2e \to Ni$ | −0.25 |
| Tin | $Sn^{2+} + 2e \to Sn$ | −0.14 |
| Lead | $Pb^{2+} + 2e \to Pb$ | −0.13 |
| Hydrogen | $2H^+ + 2e \to H_2$ | −0.00 |
| Copper | $Cu^{2+} + 2e \to Cu$ | 0.34 |
| Mercury | $Hg_2^{2+} + 2e \to 2Hg$ | 0.79 |
| Silver | $Ag^+ + e \to Ag$ | 0.80 |
| Gold | $Au^{3+} + 3e \to Au$ | 1.50 |

Thus, as will be apparent, when the cathode substrate 12 comprises one of the materials listed earlier, such as aluminum, suitable electropositive metals for inclusion in the pretreatment composition include, for example, tin, indium, gallium, cobalt, nickel, copper, silver, and gold, as well mixtures thereof.

In certain embodiments, the source of electropositive metal in the pretreatment composition is a water soluble metal salt. In certain embodiments of the present invention, the water soluble metal salt is a water soluble copper compound. Specific examples of water soluble copper compounds, which are suitable for use in the present invention include, but are not limited to, copper cyanide, copper potassium cyanide, copper sulfate, copper nitrate, copper pyrophosphate, copper thiocyanate, disodium copper ethylenediaminetetraacetate tetrahydrate, copper bromide, copper oxide, copper hydroxide, copper chloride, copper fluoride, copper gluconate, copper citrate, copper lauroyl sarcosinate, copper formate, copper acetate, copper propionate, copper butyrate, copper lactate, copper oxalate, copper phytate, copper tartarate, copper malate, copper succinate, copper malonate, copper maleate, copper benzoate, copper salicylate, copper aspartate, copper glutamate, copper fumarate, copper glycerophosphate, sodium copper chlorophyllin, copper fluorosilicate, copper fluoroborate and copper iodate, as well as copper salts of carboxylic acids in the homologous series formic acid to decanoic acid, copper salts of polybasic acids in the series oxalic acid to suberic acid, and copper salts of hydroxycarboxylic acids, including glycolic, lactic, tartaric, malic and citric acids.

When copper ions supplied from such a water-soluble copper compound are precipitated as an impurity in the form of copper sulfate, copper oxide, etc., it may be preferable to add a complexing agent that suppresses the precipitation of copper ions, thus stabilizing them as a copper complex in the solution.

In certain embodiments, the copper compound is added as a copper complex salt such as $K_3Cu(CN)_4$ or Cu-EDTA, which can be present stably in the composition on its own, but it is also possible to form a copper complex that can be present stably in the composition by combining a complexing agent with a compound that is difficultly soluble on its own. Examples thereof include a copper cyanide complex formed by a combination of CuCN and KCN or a combination of CuSCN and KSCN or KCN, and a Cu-EDTA complex formed by a combination of $CuSO_4$ and EDTA.2Na.

With regard to the complexing agent, a compound that can form a complex with copper ions can be used; examples thereof include inorganic compounds, such as cyanide compounds and thiocyanate compounds, and polycarboxylic acids, and specific examples thereof include ethylenediaminetetraacetic acid, salts of ethylenediaminetetraacetic acid, such as dihydrogen disodium ethylenediaminetetraacetate dihydrate, aminocarboxylic acids, such as nitrilotriacetic acid and iminodiacetic acid, oxycarboxylic acids, such as citric acid and tartaric acid, succinic acid, oxalic acid, ethylenediaminetetramethylenephosphonic acid, and glycine.

In certain embodiments, the electropositive metal, such as copper, is included in the pretreatment compositions in an amount of at least 2 ppm, such as at least 60 ppm, or in some cases, at least 60 ppm of total metal (measured as elemental metal). In certain embodiments, the electropositive metal is included in such pretreatment compositions in an amount of no more than 200 ppm, such as no more than 100 ppm, or in some cases, no more than 80 ppm of total metal (measured as elemental metal). The amount of electropositive metal in the pretreatment composition can range between any combination of the recited values inclusive of the recited values.

The pretreatment compositions of the present invention also comprise free fluoride. As will be appreciated, the source of free fluoride in the pretreatment compositions of the present invention can vary. For example, in some cases, the free fluoride may derive from the group IIIB and/or IVB metal compound used in the pretreatment composition, such as is the case, for example, with hexafluorozirconic acid. As the group IIIB and/or IVB metal is deposited upon the metal substrate during the pretreatment process, fluorine in the hexafluorozirconic acid will become free fluoride and, as will be appreciated, the level of free fluoride in the pretreatment composition will, if left unchecked, increase with time as metal is pretreated with the pretreatment composition of the present invention.

In addition, the source of free fluoride in the pretreatment compositions of the present invention may include a compound other than the group IIIB and/or IVB metal compound. Non-limiting examples of such sources include HF, $NH_4F$, $NH_4HF_2$, NaF, and $NaHF_2$. Fluorides or bifluorides of ammonium, phosphonium, Group IA metals, Group IIA metals, Group IIIA metals, or a combination thereof.

As used herein, the term "free fluoride" refers to isolated fluoride and its concentration in the pretreatment compositions of the present invention can be determined by measuring a pretreatment composition by a meter with a fluoride-selective electrode.

In certain embodiments, the free fluoride is included in the pretreatment compositions in an amount of at least 2 ppm, such as at least 25 ppm, or in some cases, at least 250 ppm of total metal (measured as elemental metal). In certain embodiments, the electropositive metal is included in such pretreatment compositions in an amount of no more than 1000 ppm, such as no more than 500 ppm, or in some cases, no more than 100 ppm of total metal (measured as elemental metal). The amount of electropositive metal in the pretreatment composition can range between any combination of the recited values inclusive of the recited values.

In certain embodiments, the pH of the pretreatment composition ranges from 2 to 6, such as 4.5 to 5.5. The pH of the pretreatment composition may be adjusted using, for example, any acid or base as is necessary. In certain embodiments, the pH of the solution is maintained through the inclusion of a basic material, including water soluble and/or water dispersible bases, such as sodium hydroxide, sodium carbonate, potassium hydroxide, ammonium hydroxide, ammonia, and/or amines such as triethylamine, methylethyl amine, or mixtures thereof.

In certain embodiments, the pretreatment composition comprises a resinous binder. Suitable resins include reaction products of one or more alkanolamines and an epoxy-functional material containing at least two epoxy groups, such as those disclosed in U.S. Pat. No. 5,653,823. In some cases, such resins contain beta hydroxy ester, imide, or sulfide functionality, incorporated by using dimethylolpropionic acid, phthalimide, or mercaptoglycerine as an additional reactant in the preparation of the resin. Alternatively, the reaction product is that of the diglycidyl ether of Bisphenol A (commercially available from Shell Chemical Company as EPON 880), dimethylolpropionic acid, and diethanolamine in a 0.6 to 5.0:0.05 to 5.5:1 mole ratio. Other suitable resinous binders include water soluble and water dispersible polyacrylic acids as disclosed in U.S. Pat. Nos. 3,912,548 and 5,328,525; phenol formaldehyde resins as described in U.S. Pat. No. 5,662,746; water soluble polyamides such as those disclosed in WO 95/33869; copolymers of maleic or acrylic acid with allyl ether as described in Canadian patent application 2,087,352; and water soluble and dispersible resins including epoxy resins, aminoplasts, phenol-formaldehyde resins, tannins, and polyvinyl phenols as discussed in U.S. Pat. No. 5,449,415. Other suitable resinous binders include conductive or semiconductive binders including polyacetylene, polyphenylene vinylene, polypyrrole, polythiophebne, polyphenylene sulfide, polyfluorene, polypyrene, polyazulene, polynaphthalenee, polycarbazole, polyindole, polyazepone, and/or polyaniline, or resinous binders that contain a conductive additive, such as electrically conductive particles, such as electrically conductive carbon particles, including but not limited to electrically conductive carbon blacks, carbon nanotubes, graphenes, carbon fibers, fullerenes and the like, electrically conductive silica, metal powders including aluminum, copper or special steel, molybdenum disulphide, iron oxide, black iron oxide, antimony-doped titanium dioxide and nickel doped titanium dioxide, and particles of alumina, aluminum, aromatic polyester, boron nitride, chromium, graphite, iron, molydenum, neodymim/iron/boron, samarium cobalt, silicon carbide, stainless steel, titanium diboride, tungsten, tungsten carbide, zirconia, ceramic microballoons, chopped glass fibers, graphite powder and flake, boron nitride, mica flake, copper powder and flake, nickel powder, and nickel flake coated with metals such as cobalt, copper, nickel, iron, tin, zinc, palladium, silicon, silver, titanium, and combinations of thereof.

In these embodiments of the present invention, the resinous binder is present in the pretreatment composition in an amount of 0.005 percent to 30 percent by weight, such as 0.5 to 3 percent by weight, based on the total weight of the ingredients in the composition.

In other embodiments, however, the pretreatment composition is substantially free or, in some cases, completely free of any resinous binder. As used herein, the term "substantially free", when used with reference to the absence of resinous binder in the pretreatment composition, means that any resinous binder is present in the pretreatment composition in an amount of less than 0.005 percent by weight. As used herein, the term "completely free" means that there is no resinous binder in the pretreatment composition at all.

The pretreatment composition may optionally contain other materials, such as nonionic surfactants and auxiliaries conventionally used in the art of pretreatment. In an aqueous medium, water dispersible organic solvents, for example, alcohols with up to about 8 carbon atoms, such as methanol, isopropanol, and the like, may be present; or glycol ethers such as the monoalkyl ethers of ethylene glycol, diethylene glycol, or propylene glycol, and the like, primary amines with up to about 8 carbon atoms, such as propyl amine and butylamine, secondary or tertiary amines such as triethylamine, and diisopropyl ethylamine, alkanolamines such as diisopropylethanolamine, polymeric amines such as Jeffamines, aromatic/cyclic amines such as pyridines and pyrrolidines, or sulfonamides. When present, water dispersible organic solvents are typically used in amounts up to about ten percent by volume, based on the total volume of aqueous medium.

Other optional materials include surfactants that function as defoamers or substrate wetting agents.

In certain embodiments, the pretreatment composition also comprises a reaction accelerator, such as nitrite ions, nitrate ions, nitro-group containing compounds, hydroxylamine sulfate, persulfate ions, sulfite ions, hyposulfite ions, peroxides, iron (III) ions, citric acid iron compounds, molybdate ions, bromate ions, perchlorinate ions, chlorate ions, chlorite ions as well as ascorbic acid, citric acid, tartaric acid, malonic acid, succinic acid and salts thereof. Specific examples of suitable materials and their amounts are described in United States Patent Application Publication No. 2004/0163736 A1 at [0032] to [0041], the cited portion of which being incorporated herein by reference.

In certain embodiments, the pretreatment composition also comprises a filler, such as a siliceous filler. Non-limiting examples of suitable fillers include silica, mica, montmorillonite, kaolinite, asbestos, talc, diatomaceous earth, vermiculite, natural and synthetic zeolites, cement, calcium silicate, aluminum silicate, sodium aluminum silicate, aluminum polysilicate, alumina silica gels, and glass particles. In addition to the siliceous fillers other finely divided particulate substantially water-insoluble fillers may also be employed. Examples of such optional fillers include carbon black, charcoal, graphite, titanium oxide, iron oxide, copper oxide, zinc oxide, antimony oxide, zirconia, magnesia, alumina, molybdenum disulfide, zinc sulfide, barium sulfate, strontium sulfate, calcium carbonate, and magnesium carbonate. In certain other embodiments, the pretreatment composition may also comprise a conductive filler, or a filler that contains a conductive additive, such as electrically conductive particles described above.

In certain embodiments, the pretreatment composition comprises phosphate ions. In certain embodiments, phosphate ions are present in an amount of 10 to 500 ppm of phosphate ion, such as 25 to 200 ppm phosphate ion. Exemplary sources of phosphate ion include $H_3PO_4$, $NaH_2PO_4$, and/or $(NH_4)H_2PO_4$. In certain embodiments, however, the pretreatment composition of the present invention is substantially or, in some cases, completely free of phosphate ion. As used herein, the term "substantially free" when used in reference to the absence of phosphate ion in the pretreatment composition, means that phosphate ion is present in the composition in an amount less than 10 ppm. As used herein, the term "completely free", when used with reference to the absence of phosphate ions, means that there are no phosphate ions in the composition at all.

In certain embodiments, the pretreatment composition is substantially or, in some cases, completely free of chromate and/or heavy metal phosphate, such as zinc phosphate. As used herein, the term "substantially free" when used in reference to the absence of chromate and/or heavy metal phosphate in the pretreatment composition, means that these substances are not present in the composition to such an extent that they cause a burden on the environment. That is, they are not substantially used and the formation of sludge, such as zinc phosphate, formed in the case of using a treating agent based on zinc phosphate, is eliminated. As used herein, the term "completely free", when used with reference to the absence of a heavy metal phosphate and/or chromate, means that there is no heavy metal phosphate and/or chromate in the composition at all.

Moreover, in certain embodiments, the pretreatment composition is substantially free, or, in some cases, completely free of any organic materials. As used herein, the term "substantially free", when used with reference to the absence of organic materials in the composition, means that any organic materials are present in the composition, if at all, as an incidental impurity. In other words, the presence of any organic material does not affect the properties of the composition. As used herein, the term "completely free", when used with reference to the absence of organic material, means that there is no organic material in the composition at all.

In certain embodiments, the film coverage of the residue of the pretreatment coating composition generally ranges from 2 to 400 milligrams per square meter ($mg/m^2$), such as 5 to 150 $mg/m^2$. The thickness of the pretreatment coating can vary, but it is generally very thin, often having a thickness of less than 5 to 500 nanometers, such as from 10 to 120 nanometers.

Following contact with the pretreatment solution, the substrate may be rinsed with water and dried.

In certain embodiments of the methods of the present invention, after the conductive substrate is contacted with the pretreatment composition, it is then contacted with a coating composition comprising a lithium-containing compound. Any suitable technique may be used to contact the conductive substrate with such a coating composition, including, for example, slot-die coating, doctor-blade coating, reverse-roll coating, direct-roll coating, gravure coating, extrusion coating, immersion, brushing, dipping, flow coating, spraying, electrodeposition, and the like to deposit the lithium-containing compound over at least a portion of the pretreated conductive substrate.

As previously indicated, in certain embodiments, the conductive substrate is contacted with a coating composition comprising a lithium-containing compound.

As used herein, the term "lithium-containing compound," when used in association with lithium-ion batteries, means any known type of lithium-containing compound conventionally used in coatings of electrodes of lithium ion batteries. Examples of lithium-containing compounds used in the coating composition may be $LiCoO_2$, $LiNiO_2$, $LiFePO_4$, $LiCoPO_4$, $LiMnO_2$, $LiMn_2O_4$, $Li(NiMnCo)O_2$, $Li(NiCoAl)O_2$, carbon-coated $LiFePO_4$, or mixtures thereof.

In certain embodiments, the lithium-containing compound may be present in the coating composition in an amount of at least 60 percent by weight, at least 70 percent by weight, at least 80 percent by weight, such as at least 85 percent by weight, or, in some cases, at least 90 percent by weight, based on the total weight of solids in the coating composition.

In certain embodiments, the coating composition also comprises electrically conductive particles, such as electrically conductive carbon particles, including but not limited to electrically conductive carbon blacks, carbon nanotubes, graphenes, carbon fibers, fullerenes and the like, electrically conductive silica, metal powders including aluminum, copper or special steel, molybdenum disulphide, iron oxide, black iron oxide, antimony-doped titanium dioxide and nickel doped titanium dioxide, and particles of alumina, aluminum, aromatic polyester, boron nitride, chromium, graphite, iron, molydenum, neodymim/iron/boron, samarium cobalt, silicon carbide, stainless steel, titanium diboride, tungsten, tungsten carbide, zirconia, ceramic microballoons, chopped glass fibers, graphite powder and flake, boron nitride, mica flake, copper powder and flake, nickel powder, and nickel flake coated with metals such as cobalt, copper, nickel, iron, tin, zinc, palladium, silicon, silver, titanium, and combinations of thereof.

In certain embodiments, the electrically conductive particles may have an average particle size, prior to incorporation into the coating composition, of less than 300 nanometers, such as 1 to 200 nanometers, 10 to 100 nanometers, or, in some cases, 30 to 50 nanometers.

In certain embodiments, the electrically conductive particles may be present in the composition in an amount such that the relative weight ratio of lithium-containing compound to electrically conductive particles in the composition is at least 3:1, at least 4:1, at least 5:1, at least 8:1, at least 10:1, or, in some cases, at least 15:1.

In certain embodiments, such electrically conductive particles may be present in an amount of no more than 20 percent by weight, no more than 10 percent by weight, such as 1 to 10 percent by weight, or 1 to 5 percent by weight, based on the total weight of the solids in the coating composition.

In certain embodiments, the coating composition comprises a binder. Suitable binders include polyvinylidene difluoride (PVDF), sodium carboxymethyl cellulose, polyvinyl alcohol, styrene-butadiene rubber, polytetrafluoroethylene, acrylonitrile-butadiene rubber, ethylene propylene diene monomer rubber, polyurethane, polyacrylate, polyacrylic acid, polyvinyl ether, polyimide, including copolymers and blends thereof. In certain embodiments, the coating composition may comprise a conductive or semi-conductive binder including polyacetylene, polyphenylene vinylene, polypyrrole, polythiophene, polyphenylene sulfide, polyfluorene, polypyrene, polyazulene, polynaphthalene, polycarbazole, polyindole, polyazepone, and/or polyaniline.

In certain embodiments, the binder may be present in an amount of no more than 20 percent by weight, no more than 10 percent by weight, such as 1 to 10 percent by weight, or 1 to 5 percent by weight, based on the total weight of the solids in the coating composition. In certain embodiments, the binder may be present in the coating composition in a weight percent that is equal to the weight percent of the electrically conductive particles.

In certain embodiments, the coating composition may optionally contain other materials, such as corrosion inhibitors, anti-oxidants, flow control agents, and surfactants conventionally used in the art of coatings.

In embodiments, after the conductive substrate is contacted with the coating composition comprising a lithium-containing compound, the coating is often heated to cure the deposited composition. Any suitable technique may be used to heat or cure the deposited coating composition, including, for example, warm-air drying, hot-air drying, low-humid-air drying, vacuum drying, infrared drying, far-infrared drying, and electron radiation drying. The heating or curing operation is often carried out at a temperature in the range of from ambient temperature to 250° C., such as from 120 to 190° C., for a period of time ranging from 1 to 60 minutes. In certain embodiments, the thickness of the resultant film is from 40 to 150 microns, such as 80 to 90 microns.

As will be appreciated by the foregoing description, the present invention is directed to compositions for treating a conductive substrate. In certain embodiments, these compositions comprise a group IIIB and/or IVB metal. The composition, in certain embodiments, is substantially free of heavy metal phosphate, such as zinc phosphate, and chromate.

In yet other respects, the present invention is directed to compositions for treating a conductive substrate that comprise a group IIIB and/or IVB metal. These compositions of the present invention are substantially free of phosphate ions and chromate.

Illustrating the invention are the following examples that are not to be considered as limiting the invention to their details. All parts and percentages in the examples, as well as throughout the specification, are by weight unless otherwise indicated.

EXAMPLES

Example 1

1 g of Kynar® HSV900 PVDF binder (commercially available from Arkema Inc., King of Prussia, Pa.) and 25.5 g of n-methyl-2-pyrrolidone solvent (commercially available from International Specialty Products, Inc., Wayne, N.J.) were placed into a 100 ml DAC mixing container (FlackTek, Inc., Landrum, S.C.) and stirred until complete PVDF polymer dissolution. Then, 1 g of C-Nergy™ Super C65 (commercially available from Timcal) conductive carbon and 18 g of Lithium Nickel Cobalt Manganese Dioxide TX10 (commercially available from Umicore) were added to the container. After screwing on the lid, the container was placed in the Speedmixer DAC 600 FVZ (FlackTek, Inc.) and mixed at 2350 RPM for 5 minutes. The resulting lithium ion battery cathode slurry was then drawn down over ethanol cleaned aluminum foil (commercially available from Targray Technology International Inc., Rancho Dominguez, Calif.) using a doctor blade set at a 400 micron gap and an automatic drawdown table (MTI Corporation, Richmond, Calif.). The coating was then dried at 120° C. for 20 minutes. The coated foil was run through a calendar press set at a 0.030 mm gap, compressing the coating from 93 to 65 microns thick.

This coated sample was tested for 180° peel adhesion strength using an Instron tensiometer and a method very similar to ASTM D903-98, "Standard Test Method for Peel or Stripping Strength of Adhesive Bonds", except that a pull rate of 2 inches per minute was used and no further sample conditioning was used.

The average maximum peel force, or peel strength, in Newtons for this coated sample is shown in Table 1 below.

Example 2

Bath A was prepared using 30.0 grams Chemfos AFL (a liquid free fluoride additive commercially available from PPG Industries, Inc., Euclid, Ohio) and 11.4 liters deionized water. The pH of Bath A was 3.6 and the free fluoride was 220 ppm.

Bath B was prepared using 11.4 liters deionized water, 10.0 g fluorozirconic acid (45 wt % in water), and 8.4 g Chemfos AFL (PPG Industries). The pH was adjusted to 4.5 with Chemfil buffer (an alkaline material commercially available from PPG Industries, Inc.). The zirconium level was 180 ppm and the free fluoride was 100 ppm in Bath B.

Ethanol cleaned aluminum foil was secured into an aluminum rack with four stainless steel binder clips. The foil was immersed into an acidic fluoride etch bath (Bath A) for two minutes at 70° F. The foil was immediately placed into a bath containing zirconium and fluoride (Bath B) for two minutes at 80° F. The pretreated foil was then rinsed with deionized water for thirty seconds and dried with hot air (130° F.).

The pretreated foil was then coated and tested as described in Example 1. The average maximum peel force, or peel strength, in Newtons for this pretreated and coated sample is shown in Table 1 below.

Example 3

Bath A was prepared as described in Example 2.

Bath B was prepared as described in Example 2, except that 12.0 grams copper nitrate solution (2.0 wt % in deionized water) was added to Bath B. The zirconium level was 180 ppm, the free fluoride was 100 ppm, and the copper level was 20.0 ppm in Bath B.

The foil was then pretreated, coated, and tested as described in Example 2.

The average maximum peel force, or peel strength, in Newtons for this pretreated and coated sample is shown in Table 1 below.

Example 4

Bath A was prepared as described in Example 2.

Bath B was prepared as described in Example 2, except that 24.0 grams copper nitrate solution (2.0 wt % in deionized water) was added to Bath B. The zirconium level was 180 ppm, the free fluoride was 100 ppm, and the copper level was 40.0 ppm in Bath B.

The foil was then pretreated, coated, and tested as described in Example 2.

The average maximum peel force, or peel strength, in Newtons for this pretreated and coated sample is shown in Table 1 below.

Example 5

Bath A was prepared as described in Example 2.

Bath B was prepared as described in Example 2, except that 36.0 grams copper nitrate solution (2.0 wt % in deionized water) was added to Bath B. The zirconium level was 180 ppm, the free fluoride was 100 ppm, and the copper level was 60.0 ppm in Bath B.

The foil was then pretreated, coated, and tested as described in Example 2.

The average maximum peel force, or peel strength, in Newtons for this pretreated and coated sample is shown in Table 1 below.

Example 6

Bath A was prepared as described in Example 2.

Ethanol cleaned aluminum foil was secured into an aluminum rack with four stainless steel binder clips. The foil was immersed into an acidic fluoride etch bath (Bath A) for two minutes at 70° F. The fluoride-etched foil was then rinsed with deionized water for thirty seconds, dried with hot air (130° F.), and was then coated and tested as described in Example 1.

The average maximum peel force, or peel strength, in Newtons for this pretreated and coated sample is shown in Table 1 below.

TABLE 1

| Example | Pretreatment | Average Maximum Peel Force (N) | Standard Deviation |
|---|---|---|---|
| 1 | None | 1.47 | 0.19 |
| 2 | 180 ppm Zr | 1.65 | 0.45 |
| 3 | 180 ppm Zr, 20 ppm Cu | 1.95 | 0.29 |
| 4 | 180 ppm Zr, 40 ppm Cu | 2.21 | 0.32 |
| 5 | 180 ppm Zr, 60 ppm Cu | 2.08 | 0.08 |
| 6 | Fluoride etch | 1.07 | 0.05 |

The pretreatment Examples 2-5 above exhibit significantly increased average maximum peel force, demonstrating significantly improved coating adhesion, e.g., greater than 10 percent, for example greater than 25 or 30 percent, or greater than 40 or 50 percent.

It will be appreciated by those skilled in the art that changes could be made to the embodiments described above without departing from the broad inventive concept thereof. It is understood, therefore, that this invention is not limited to the particular embodiments disclosed, but it is intended to cover modifications which are within the spirit and scope of the invention, as defined by the appended claims.

We claim:

1. A cathode of a lithium-ion battery comprising:
   a conductive substrate;
   a film covering at least a portion of the conductive substrate comprising a pretreatment composition comprising a Group IIIB metal, a Group IVB metal, or combinations thereof, wherein the pretreatment composition, upon contact with the conductive substrate, reacts with and chemically alters the substrate surface and binds to it to form a protective layer; and
   a second layer covering at least a portion of the film, the second layer comprising a coating composition comprising a lithium-containing compound.

2. The cathode of claim 1, wherein the Group IIIB metal, the Group IVB metal, or combinations thereof, comprises zirconium.

3. The cathode of claim 1, wherein the Group IIIB metal, the Group IVB metal, or combinations thereof, is present in the pretreatment composition in an amount of at least 20 ppm metal.

4. The cathode of claim 1, wherein the pretreatment composition further comprises an electropositive metal present in an amount of at least 2 ppm metal.

5. The cathode of claim 4, wherein the electropositive metal comprises tin, indium, gallium, cobalt, nickel, copper, silver, gold, or a combination thereof.

6. The cathode of claim 1, wherein the pretreatment composition further comprises a free fluoride source present in an amount of at least 2 ppm.

7. The cathode of claim 6, wherein the free fluoride source comprises fluorides or bifluorides of ammonium, phosphonium, Group IA metals, Group IIA metals, Group IIIA metals, or a combination thereof.

8. The cathode of claim 1, wherein the lithium-containing compound comprises lithium nickel cobalt manganese dioxide, lithium iron phosphate, carbon-coated lithium iron phosphate, or a combination thereof.

9. The cathode of claim 1, wherein the lithium-containing compound comprises from 80 to 90 weight percent, based on a total weight of the coating, and wherein the coating composition further comprises a conductive agent comprising from 5 to 10 weight percent and a binder comprising from 5 to 10 weight percent, based on the total weight of the coating.

10. The cathode of claim 1, wherein the cathode has a 180° peel adhesion strength of greater than 1.5 N.

11. The cathode of claim 1, wherein the film has a thickness of 5 to 500 nm.

12. The cathode of claim 1, wherein the cathode comprises aluminum.

13. A battery comprising:
   a cathode comprising:
     a conductive substrate;
     a film covering at least a portion of the conductive substrate comprising a pretreatment composition comprising a Group IIIB metal, a Group IVB metal, or combinations thereof, wherein the pretreatment composition, upon contact with the conductive substrate, reacts with and chemically alters the substrate surface and binds to it to form a protective layer; and
     a second layer covering at least a portion of the film, the second layer comprising a coating composition comprising a lithium-containing compound;
   an anode;
   a separator between the anode and the cathode; and
   an electrolyte in contact with the anode and the cathode.

14. The battery of claim 13, wherein the Group IIIB metal, the Group IVB metal, or combinations thereof, comprises zirconium.

15. The battery of claim 13, wherein the pretreatment composition further comprises an electropositive metal.

16. The battery of claim 13, wherein the pretreatment composition further comprises a free fluoride source.

17. The battery of claim 13, wherein the lithium-containing compound comprises from 80 to 90 weight percent, based on a total weight of the coating, and wherein the coating composition further comprises a conductive agent comprising from 5 to 10 weight percent and a binder comprising from 5 to 10 weight percent, based on the total weight of the coating.

18. The battery of claim 13, wherein the conductive substrate comprises aluminum.

19. A method for treating a battery cathode, comprising:
   contacting a conductive substrate of the battery cathode with a pretreatment composition comprising a Group IIIB metal, a Group IVB metal, or combinations thereof, wherein the pretreatment composition, upon contact with the conductive substrate, reacts with and chemically alters the substrate surface and binds to it to form a protective layer; and
   depositing a coating composition comprising lithium-containing compounds over at least a portion of the pretreated conductive substrate.

20. The method of claim 19, further comprising contacting the conductive substrate with a fluoride solution prior to contacting the conductive substrate with the pretreatment composition.

* * * * *